Jan. 8, 1963

W. D. COHEN 3,072,311

TAPE HANDLING SYSTEM

Filed March 29, 1960

INVENTOR.
William D. Cohen
BY
S.C. Yuter
ATTORNEY

United States Patent Office 3,072,311

Patented Jan. 8, 1963

3,072,311
TAPE HANDLING SYSTEM

William D. Cohen, Syosset, N.Y., assignor to Digitronics Corporation, Albertson, N.Y., a corporation of Delaware Filed Mar. 29, 1960, Ser. No. 18,361
8 Claims. (Cl. 226—196)

This invention is related to tape handling apparatus and more particularly to apparatus for storing and moving an endless loop of tape.

In magnetic tape, as well as punched paper tape systems, it is customary to store the tapes on reels. However, when relatively short lengths of tape must be read repeatedly, and in particular, when it is necessary to quickly locate a predetermined portion of the tape, it is possible to minimize the cost, complexity and search time by dispensing with the tape reels and use an endless loop of tape. Such a loop is commonly stored in a vertical bin only as wide as the tape, in which the tape is folded back and forth in a serpentine manner in at least one portion of the bin.

However, the use of such bin and tape configurations has in the past been seriously handicapped because of the difficulty in initially loading the tape in the bin. Heretofore, it has been necessary to first mount the tape on the transport mechanism and then carefully form the serpentine folds in the bin. Such an operation is extremely time consuming and highly unreliable. Any slight variations in the folding scheme often lead to jamming, which in turn can easily lead to tape damage. Likewise, attempts to use the transport mechanism to load the tape into the bin have in the past often led to jamming of the tape.

It is accordingly a general object of the invention to provide an improved endless tape handling apparatus.

It is another object of the invention to provide an improved endless tape bin that can be rapidly and reliably loaded with an endless loop of tape.

It is a further object of the invention to provide an improved endless tape bin that can be easily loaded and is substantially jamproof.

Briefly, in accordance with the invention, a tape receptacle or bin is provided for storing an endless loop of tape. The bin comprises an enclosure having front and rear walls connected by a sidewall. A partition in the enclosure extends from substantially the top of the enclosure toward the bottom of the enclosure to provide two separate regions that are separated near the bottom of the enclosure by a gap between the partition and the sidewall. A slot in the sidewall adjacent the gap is provided so that the tape may be initially threaded therethrough to simplify the loading of the tape.

Features of the invention include an oblique orientation of the partition within the enclosure as well as a wiping means disposal near the gap to guide the tape.

Figure 1:
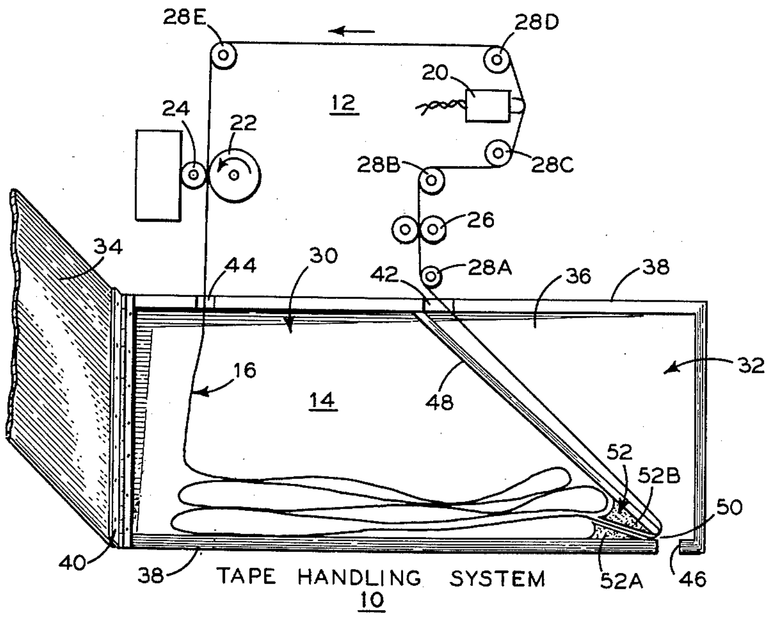
Figure 2:
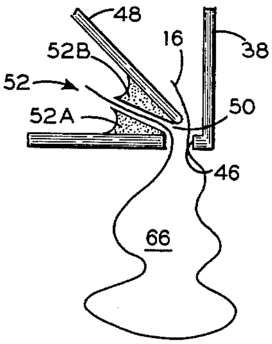
Figure 3:
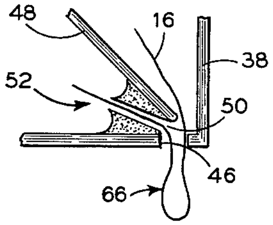
Figure 4:
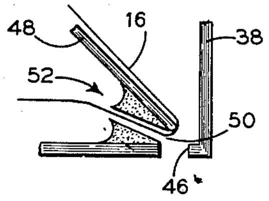

Other objects, features and advantages of the invention will be apparent from the following detailed description of the invention when read with the accompanying drawings wherein:

FIGURE 1 shows an endless tape handling system which includes a tape bin in accordance with the invention; and FIGURES 2 to 4 show a portion of the tape bin during the initial loading and moving of the tape.

Referring to FIGURE 1, there is shown a tape handling system 10 which includes a tape transport and transducing means 12 and a tape bin 14 for an endless loop of tape 16. The tape transport and transducing means 12 which is of conventional design includes by way of example a transducer 20, a capstan 22 with a drive motor (not shown), a solenoid operated pinch roller 24, and a solenoid operated brake block 26. A pulley system 28 guides the tape from the tape bin 14, via the brake block 26 to the transducer 20 and the capstan 22 back to the tape bin 14.

When the loop of tape 16 is properly loaded, as hereinafter described, and the solenoid operated pinch roller 24 is activated forcing the tape against capstan 22, capstan 22 pulls the loop of tape 16 from tape bin 14 through unactivated brake blocks 26, across transducer 20 to tape bin 14. In order to stop the movement of tape loop 16, solenoid operated pinch roller 24 is deactivated and brake blocks 26 are activated.

Tape bin 14 is generally a two regioned enclosure, a tape storage region 30 and a tape feed region 32. More particularly, tape bin 14 comprises a front wall 34, a rear wall 36 and a side wall means 38. One side of front wall 34 is hinged to the edge 40 of sidewall means 38. The width of sidewall means 38 is such that the enclosure has a depth slightly greater than the width of the tape in the loop of tape 16. Disposed along the top of sidewall means 38 is a tape exit slot 42 and a tape entrance slot 44. Disposed along the bottom of sidewall means 38 is a tape loading slot 46. Partition 48 obliquely extends from the region along the top of sidewall means 38 between tape exit slot 42 and tape entrance slot 44 toward tape loading slot 46. Partition 48, however, does not completely extend to the bottom of sidewall member 38 but provides a gap 50 which connects tape storage region 30 to tape feed region 32. Disposed on the tape storage region side of gap 50 is a wiper means 52, hereinafter more fully described.

An initial loading of tape loop 16 will now be described. Front wall 34 is opened. Tape loop 16 is fixed on the tape transport and transducer means 12. The tape loop 16 is fitted into tape entrance slot 44 and tape exit slot 42 and drawn along the respective sides of partition 48 through tape loading slot 46 and accumulated in a free loop 66 below the tape bin 14 as shown in FIGURE 2. It should be noted that there is, at this time, no excess tape in either tape storage region 30 or tape feed region 32. After the front wall 34 is closed and the tape transport and transducer means 14 is energized, all the tape is drawn from free loop 66 and simultaneously fed through tape entrance slot 44 until the tape is drawn against the partition 48. After this time, tape will be drawn from tape storage region 30. See FIGURES 2, 3 and 4. All the time that free loop 66 was being taken up, the return of the tape from the transport and transducer means 12 via the tape entrance slot 44 was accumulated in tape storage region 30 in a serpentine manner as shown in FIGURE 1.

In order to insure that there is no jamming of the tape in gap 50 because of several curls of the serpentine folds being drawn toward the gap simultaneously due to friction, wiper 52 is provided. Wiper 52 comprises two wedge shaped wiper blocks 52A and 52B. Wedge-shaped wiper block 52A is fixed to the bottom of sidewall means 38 with its apex toward gap 50 and with its concave base facing tape storage region 30. Wedge-shaped wiper 52B is fixed to partition 48 with its apex towards gap 50 and with its concave base facing tape storage region 30. The other faces of wedge-shaped wiper blocks 52A and 52B are substantially parallel to each other and slightly spaced to provide a channel for the passage of the tape of tape loop 16. Thus, as the curls of the serpentine folds try to wedge into gap 50, the concave faces essentially "scrape" the curls away.

There has thus been shown improved endless loop tape handling apparatus which by employing a tape loading slot in a tape bin opposite the partition which separates the tape storage region from the tape feed region permits easy and reliable loading. In addition, by providing an obliquely extending partition in the enclosure which cooperates with wiper means, the possibility of tape jamming during operation is minimized.

There will now be obvious to those skilled in the art many modifications and variations utilizing the principles set forth and realizing many or all of the objects and advantages, but which do not depart essentially from the spirit of the invention.

What is claimed is:

1. A tape receptacle for storing an endless loop of tape comprising a front wall, a rear wall and sidewall means joining at least the bottom and side edges of said front and rear walls for forming an enclosure having a depth slightly greater than the width of said tape, a partition in said enclosure obliquely extending from substantially the top edges of said walls toward the bottom edges of said walls for dividing said enclosure into first and second regions connected near the bottom edges of said front and rear walls by a narrow gap between the end of said partition and said sidewall means, and an initial loading slot in the sidewall means opposite said gap through which said loop of tape is initially threaded with a loop initially remaining outside of said enclosure.

2. A tape bin for storing an endless loop of tape comprising a front wall, a rear wall, and sidewall means joined to at least the bottom and side edges of one of said walls and hingeable joined to a side edge of the other of said walls for forming an enclosure having a depth slightly greater than the width of said tape, a partition in said enclosure extending from substantially the top edges of said front and rear walls toward the bottom edges of said front and rear walls for dividing said enclosure into first and second regions connected near the bottom edges of said front and rear walls by a narrow gap between the end of said partition and said sidewall means, and an initial loading slot in the sidewall means opposite said gap through which said loop of tape is initially threaded with a loop initially remaining outside of said enclosure.

3. Tape handling apparatus for an endless loop of tape to be driven by an external separate tape driving means, said apparatus comprising a front wall, a rear wall, and sidewall means joined to at least the bottom and side edges of one of said walls and hingeably joined to a side edge of the other of said walls for forming an enclosure having a depth slightly greater than the width of said tape, a partition in said enclosure extending from substantially the top edges of said front and rear walls toward the bottom edges of said front and rear walls for dividing said enclosure into first and second regions connected near the bottom edges of said front and rear walls by a narrow gap between the end of said partition and said sidewall means, and a first access means between said first region and the outside of said apparatus to enable the tape to be coupled to such tape driving means, second access means between said second region and the outside of said apparatus to enable the tape to be coupled to such tape driving means and an initial loading slot in the sidewall means opposite said gap whereby said tape is initially looped over said tape driving means, along each side of said partition and through said slot with all excess tape being outside said enclosure.

4. The apparatus of claim 3 wherein said partition obliquely extends from substantially the top edges of said front and rear walls toward the bottom edges of said front and rear walls.

5. The apparatus of claim 3 wherein said sidewall means has a top wall portion joined to the top edge of said one wall, and said first and second access means are first and second slots in said top wall portion disposed on opposite sides of said partition.

6. A tape bin for storing an endless loop of tape comprising a front wall, a rear wall, and sidewall means joining at least the bottom and side edges of one of said walls for forming an enclosure having a depth slightly greater than the width of said tape, a partition in said enclosure obliquely extending from substantially the top edges of said front and rear walls toward the bottom edges of said front and rear walls for dividing said enclosure into first and second regions connected near the bottom edges by a narrow gap between the end of said partition and said sidewall means, a wiping means disposed in said first region near said gap for preventing said tape from jamming in said gap, and an initial loading slot in the sidewall means opposite said gap through which said loop of tape is initially threaded.

7. The tape bin of claim 6 wherein said wiping means comprises at least a wiper block having first and second faces substantially parallel respectively to said partition and the bottom edges of said front and rear walls and a third concave inward face toward said first region.

8. The tape bin of claim 6 wherein said wiping means comprises a pair of wedged shaped wiper blocks whose apeces face said gap and whose bases are concave inward and face said first region, a first side of the first of said wiper blocks being fixed to said portion, a first side of the second of said wiper blocks being fixed to said sidewalls means, and the second sides of said wiper blocks facing each other in spaced substantially parallel relation.

References Cited in the file of this patent

UNITED STATES PATENTS

| | | |
|---|---|---|
| 1,883,987 | Lasowsky | Oct. 25, 1932 |
| 2,631,034 | Eddy | Mar. 10, 1953 |
| 2,657,047 | Eddy | Oct. 27, 1953 |
| 2,679,394 | Lear | May 25, 1954 |
| 2,696,092 | Miller | Dec. 7, 1954 |
| 2,742,284 | Munroe | Apr. 17, 1956 |

UNITED STATES PATENT OFFICE
CERTIFICATE OF CORRECTION

Patent No. 3,072,311 January 8, 1963

William D. Cohen

It is hereby certified that error appears in the above numbered patent requiring correction and that the said Letters Patent should read as corrected below.

Column 1, line 55, for "disposal" read -- disposed --; column 2, line 42, for "14" read -- 12 --; column 4, line 38, for "apeces" read -- apexes --; line 40, for "portion" read -- partition --.

Signed and sealed this 17th day of December 1963.

(SEAL)
Attest:
ERNEST W. SWIDER

Attesting Officer

EDWIN L. REYNOLDS

Acting Commissioner of Patents